(12) United States Patent
Ikeda et al.

(10) Patent No.: US 7,316,353 B2
(45) Date of Patent: Jan. 8, 2008

(54) LINE-ILLUMINATING DEVICE AND IMAGE-SCANNING DEVICE

(75) Inventors: Makoto Ikeda, Tokyo (JP); Hiroyuki Nemoto, Tokyo (JP)

(73) Assignee: Nippon Sheet Glass, Co., Ltd., Tokyo (JP)

( * ) Notice: Subject to any disclaimer, the term of this patent is extended or adjusted under 35 U.S.C. 154(b) by 429 days.

(21) Appl. No.: 11/025,431

(22) Filed: Dec. 29, 2004

(65) Prior Publication Data

US 2005/0150956 A1    Jul. 14, 2005

(30) Foreign Application Priority Data

Jan. 8, 2004    (JP) ............... 2004-003299

(51) Int. Cl.
*G06K 7/10*    (2006.01)

(52) U.S. Cl. ............. 235/454; 235/462.01; 235/462.13

(58) Field of Classification Search ................ 235/454, 235/462.01, 462.13; 362/551; 385/140, 385/146
See application file for complete search history.

(56) References Cited

U.S. PATENT DOCUMENTS 7,125,151 B2 *   10/2006   Uemura et al. ............. 362/602

FOREIGN PATENT DOCUMENTS

| JP | 06-148435 | 5/1994 |
|----|-----------|--------|
| JP | 07-014414 | 1/1995 |
| JP | 2000-196820 | 7/2000 |

* cited by examiner

*Primary Examiner*—Karl D. Frech
(74) *Attorney, Agent, or Firm*—Carrier, Blackman & Associates, P.C.; Joseph P. Carrier; William D. Blackman

(57) ABSTRACT

A line-illuminating device comprises a white casing, a bar-shaped light guide housed within the casing, and light-emitting units provided on opposite ends of the bar-shaped light guide. The light-emitting unit has a substrate forming a circuit on which a lead wire for power supply is installed. Formed on a surface of the substrate facing the bar-shaped light guide is a window for coupling in which a green-color light-emitting diode and a blue-color light-emitting diode are installed. Likewise, the light-emitting unit has a substrate on which a lead wire for power supply is installed. Formed on a surface of the substrate facing the bar-shaped light guide is a window for coupling in which two red-color light-emitting diodes are installed.

16 Claims, 4 Drawing Sheets

LINE-ILLUMINATING DEVICE AND IMAGE-SCANNING DEVICE

BACKGROUND OF THE INVENTION

1. Field of the Invention

The present invention relates to a line-illuminating device having a bar-shaped light guide and a light-emitting unit and to an image-scanning device in which the line-illuminating device is incorporated.

2. Description of the Background Art

A contact-type image sensor (i.e., an image-scanning device) is used as a device for scanning a document using a facsimile machine, a copying machine, an image scanner and the like. The contact-type image sensor is provided with a line-illuminating device for linearly illuminating a document surface along a main scanning field.

A line-illuminating device using a light guide is known. For example, Patent Document 1 proposes a line-illuminating device in which a light-emitting unit is provided on one end of the light guide and a light-scattering pattern is formed to diffuse and reflect the light from the light-emitting unit along the longitudinal direction of the light guide. A plurality of light sources (LEDs) of the light-emitting unit is provided on a normal line of the light-scattering pattern and a light-emitting surface is formed in a direction differing from the normal line.

Disclosed in Patent Documents 2 and 3 is the type of line-illuminating device in which light-emitting units are provided on both ends of the bar-shaped light guide or part of the surface of the bar-shaped light guide is provided to serve as the light-scattering surface.

[Patent Document 1] Japanese Patent No. 3083092

[Patent Document 2] Japanese Unexamined Patent Publication No. HEI 6-148435

[Patent Document 3] Japanese Unexamined Patent Publication No. HEI 7-14414

FIG. 7 is a view explaining a coupling section of a light-emitting unit and a bar-shaped light guide used in the above-mentioned Document 1. In the conventional light-emitting unit, a substrate 100 forming a circuit is provided with a window 101 for coupling. Each light-emitting element 102, 103 and 104 of three primary colors of red, green and blue is disposed within the window 101. Electricity is fed to the circuit for light emission formed in the substrate 100 through lead wires 105.

Each light-emitting element has an area about 0.3 mm square and a space of 0.8 mm or more must be provided between the light-emitting elements to avoid overheating due to heat dissipation. As a result, the window 101 has a size of about 1.1 mm×2.8 mm. If the window 101 is larger than a cross section of a light guide 106 when installed, the light comes through. Thus, the cross section of the light guide 106 must have such a size as to completely cover the window 101.

In the known system, since the cross-sectional shape of the bar-shaped light guide is designed to completely cover the window 101, limitations are imposed on the size of the cross section of the bar-shaped light guide. As a result, it is difficult to set the density of the energy of light traveling inside the bar-shaped light guide above a certain level. When the density of the light energy is low, it is not possible to effect radiation with such directional characteristics as to brightly illuminate a narrow area of a document surface.

SUMMARY OF THE INVENTION

It is therefore an object of the present invention to provide a line-illuminating device which can increase the density of the energy of light traveling the inside a bar-shaped light guide.

To attain the above-mentioned object, a line-illuminating device according to the present invention is provided, in which light-emitting units are provided on opposite ends of a bar-shaped light guide, each light-emitting unit having a substrate on which one or two-color light-emitting elements of three primary colors is installed, and the light-emitting elements of the light-emitting units on opposite ends collectively satisfy the provision of all three primary colors.

To give an actual example, the light-emitting unit on one end is provided with a green-color light-emitting element and a blue-color light-emitting element, while the light-emitting unit on the other end is provided with a red-color light-emitting element, or the light-emitting unit on one end is provided with a blue-color light-emitting element and a red-color light-emitting element, while the light-emitting unit on the other end is provided with a green-color light-emitting element and a red-color light-emitting element.

In this manner, if the number of light-emitting elements provided on each light-emitting unit is set at one or two by allocating the light-emitting elements of three primary colors between the light-emitting units on both ends, it is possible to make the window for coupling smaller, thereby making the cross section of the bar-shaped light guide smaller.

According to another embodiment of the present invention, the substrate of the light-emitting unit is provided with three windows and each light-emitting element of the three primary colors is disposed in each window, wherein three bar-shaped light guides are provided to correspond to the three windows, respectively. With this arrangement, it is also possible to increase the density of light energy within the bar-shaped light guide.

It is to be noted that the present invention includes not only the line-illuminating device, but also an image-scanning device in which the line-illuminating device is incorporated.

According to the present invention, it is possible to make the coupling window formed on the substrate of the light-emitting unit smaller and as a result, a cross sectional area of the bar-shaped light guide can be made smaller. When the cross sectional area of the bar-shaped light guide is made smaller, the density of light energy traveling the inside the bar-shaped light guide is increased and, as a result, it is possible to brightly illuminate a narrow area of a document even though scattering dots formed on the bar-shaped light guide are made smaller.

Specifically, since two LED chips are provided on the substrate instead of the conventional three LED chips, the window formed on the substrate becomes ⅔ or less in terms of size and the density of light energy becomes more than 1.5 times larger.

In this manner, it is possible to provide an extremely high-precision line-illuminating device by applying the present invention to a facsimile machine, a copying machine, an image scanner and the like in which the bar-shaped light guide is provided close to a document surface.

BRIEF DESCRIPTION OF THE DRAWINGS

The above and other objects, features and advantages of the present invention will become more apparent from the following description when taken in conjunction with the accompanying drawings.

DETAILED DESCRIPTION OF THE PREFERRED EMBODIMENTS

Figure 1:
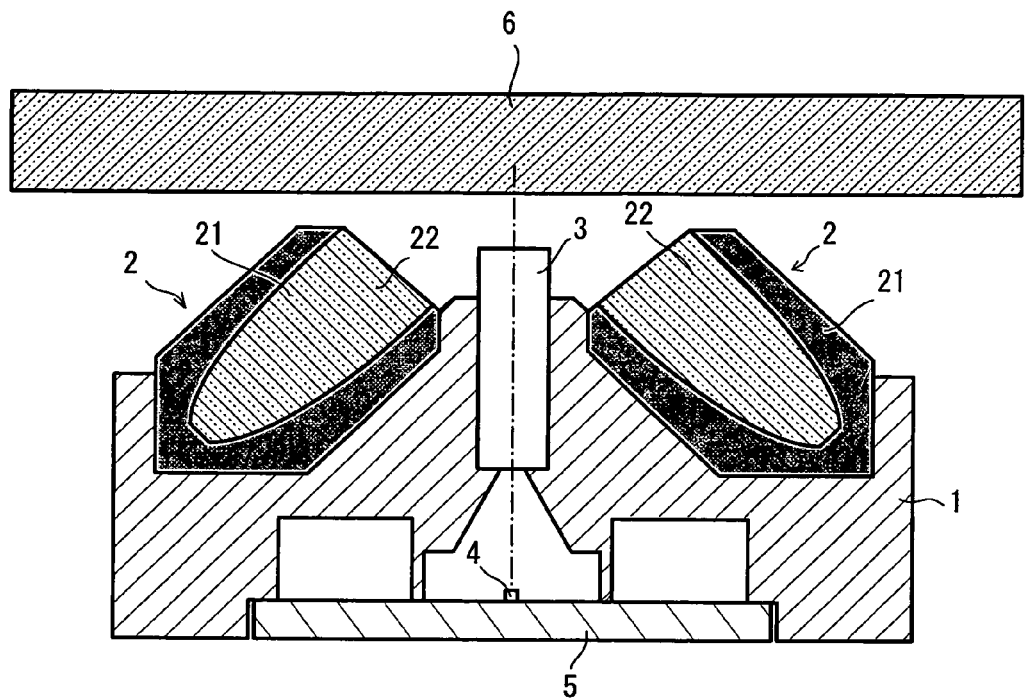
FIG. 1 is a cross-sectional view of a contact-type image sensor to which a line-illuminating device according to the present invention is applied.
Figure 2:
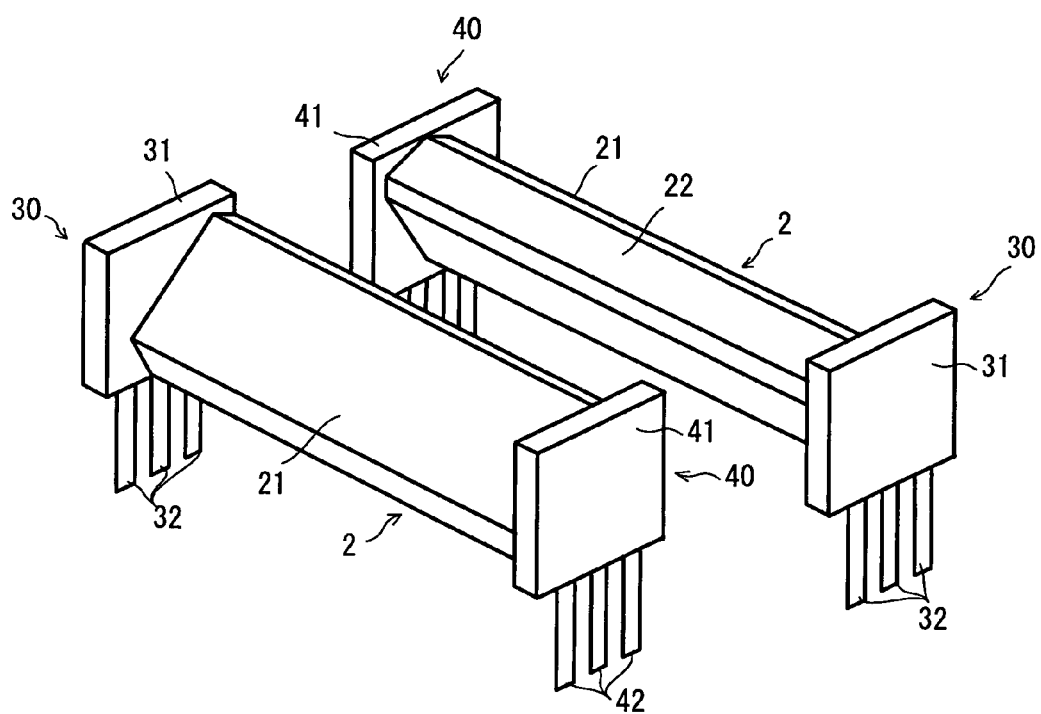
FIG. 2 is a perspective view of a pair of line-illuminating devices.
Figure 3:
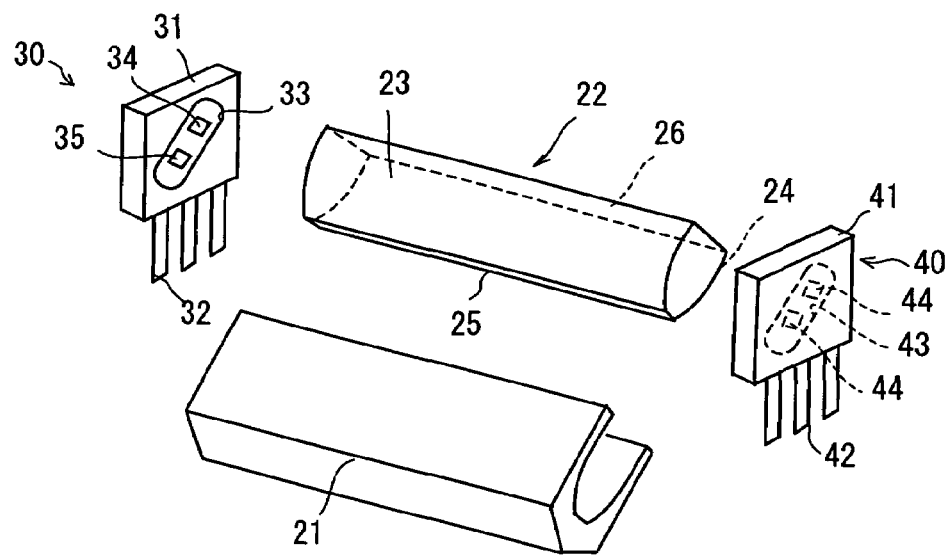
FIG. 3 is an exploded perspective view of a line-illuminating device according to the present invention.

Preferred embodiments of the present invention will now be described with reference to the accompanying drawings. FIG. 1 is a cross-sectional view of a contact-type image sensor to which a line-illuminating device according to the present invention is applied. FIG. 2 is a perspective view of a pair of line-illuminating devices incorporated in the contact-type image sensor. FIG. 3 is an exploded perspective view of a line-illuminating device according to the present invention.

A contact-type image sensor is provided, in which two sets of line-illuminating devices 2 and 2 are incorporated in a holding body 1. A lens array 3 of an erecting unit magnification system is disposed within the holding body 1. Formed at the lower part of the holding body 1 is a plate 5 on which a line image sensor 4 is mounted. A document table 6 (i.e., a glass plate) is provided above the line-illuminating devices 2 and 2.

As shown in FIG. 3, the line illuminating device 2 comprises a white casing 21, a bar-shaped light guide 22 housed within the casing 21 and light-emitting units 30 and 40 provided on opposite ends of the bar-shaped light guide 22.

Figure 4:
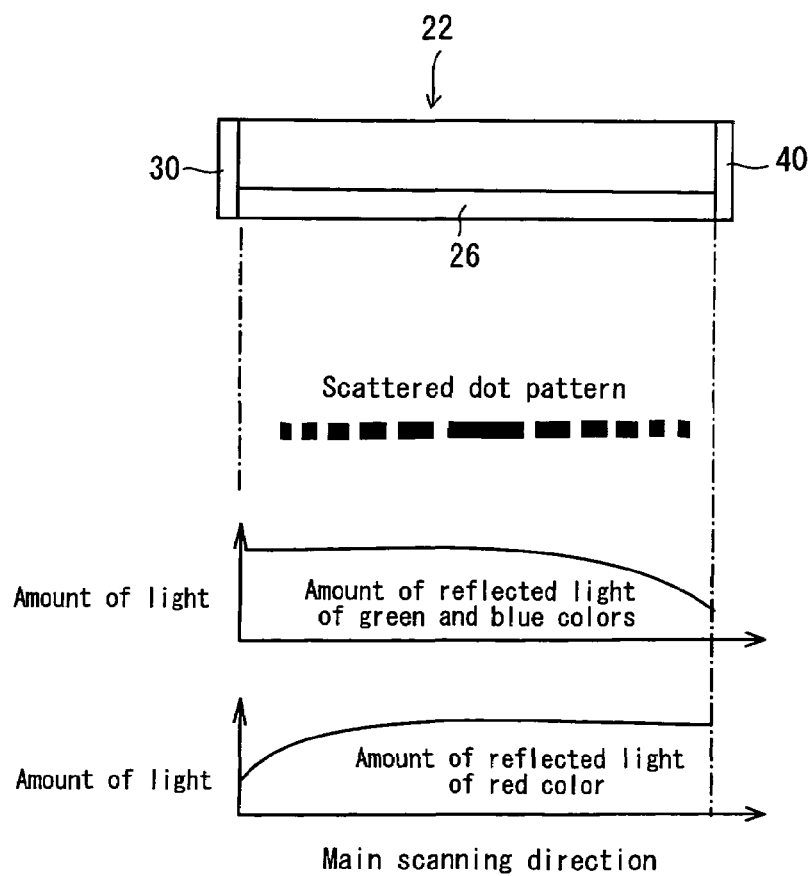
FIG. 4 is a view showing the amount of reflected light of three primary colors of the line-illuminating device according to the present invention in the longitudinal direction.

The bar-shaped light guide 22 is made of acrylic resin and the like. When seen from the end face, both sides 23 and 24 of the bar-shaped light guide 22 are formed one quarter (¼) oval or parabolic and the bottom surface 25 and the upper surface 26 thereof are formed flat. The bottom surface 25 is provided with scattering dots for causing the light introduced into the bar-shaped light guide 22 to reflect diffusely and the upper surface 26 is designed to serve as a light-emitting surface. As shown in FIG. 4, the scattering dots are formed to have a larger area at the center section and to be gradually smaller toward the ends.

The light-emitting unit 30 has a substrate 31 forming a circuit to which a lead wire 32 for power supply is attached. Formed on a surface of the substrate 31 facing the bar-shaped light guide 22 is a window 33 for coupling in which a green-color light-emitting diode 34 and a blue-color light-emitting diode 35 are installed.

On the other hand, the light-emitting unit 40 likewise has a substrate 41 to which a lead wire 42 for power supply is attached. A window 43 for coupling is formed on a surface of the substrate 41 facing the bar-shaped light guide 22 and two red-color light-emitting diodes 44 are installed within the window 43. In this case, chip-type light-emitting diodes 34, 35 and 44 (i.e., LED chips) are used.

It is also possible to install the blue-color light-emitting diode and the red-color light-emitting diode on the light-emitting unit 30 and the green-color light-emitting diode and the red-color light-emitting diode on the light-emitting unit 40.

FIG. 4 is a view measuring an amount of reflected light of three primary colors of the line-illuminating device in the longitudinal direction (i.e., main scanning direction) in the case of the scattering dot pattern above, wherein (a) shows the scattering dot pattern, (b) shows the amount of reflected light of green and blue-color LED light (Vertical axis: Amount of reflected light; Horizontal axis: Position in the longitudinal direction), and (c) shows the amount of reflected light of a red-color LED light. As is obvious from this figure, the green and blue-color LED light gradually decreases in amount in the vicinity of the other end, while the red-color LED light gradually decreases in amount in the vicinity of one end. It is possible to control the distribution of the amount of light in the longitudinal direction by the scattering dot pattern.

Figure 5:
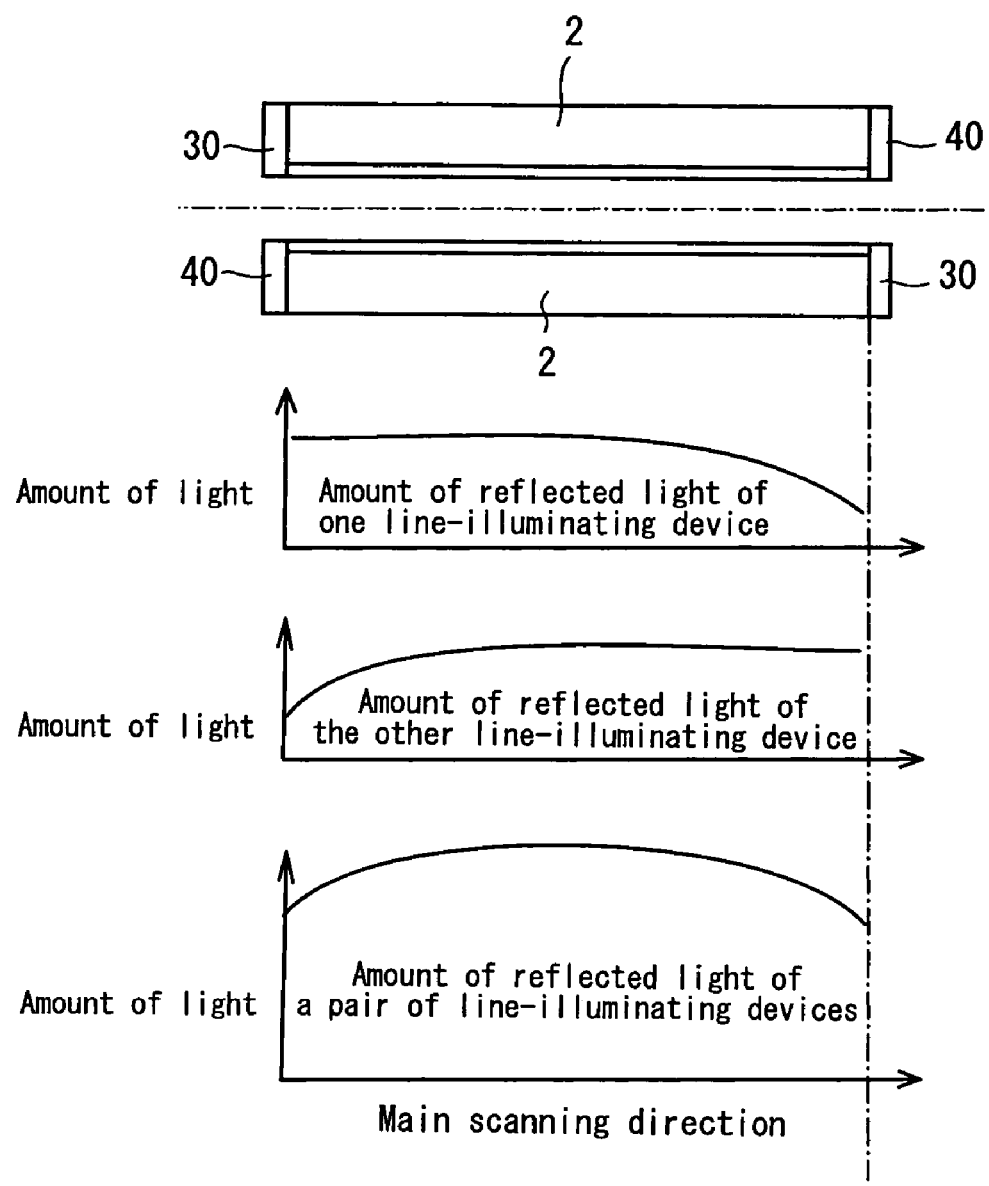
FIG. 5 is a view showing the amount of reflected light of three primary colors of the line-illuminating device according to the present invention when the device is provided in pairs.

FIG. 5 is a view showing the amount of reflected light of three primary colors of the line-illuminating device according to the present invention when the device is provided in pairs. In this embodiment, since the light-emitting units 30 and 40 are provided to be symmetric with respect to a point by a pair of line-illuminating devices, both the amount of reflected light of the green and blue-color LED light and the amount of reflected light of the red-color LED light are added together for each line-illuminating device. As a result, it is possible to obtain flatter characteristics than when one line-illuminating device is provided.

Figure 6:
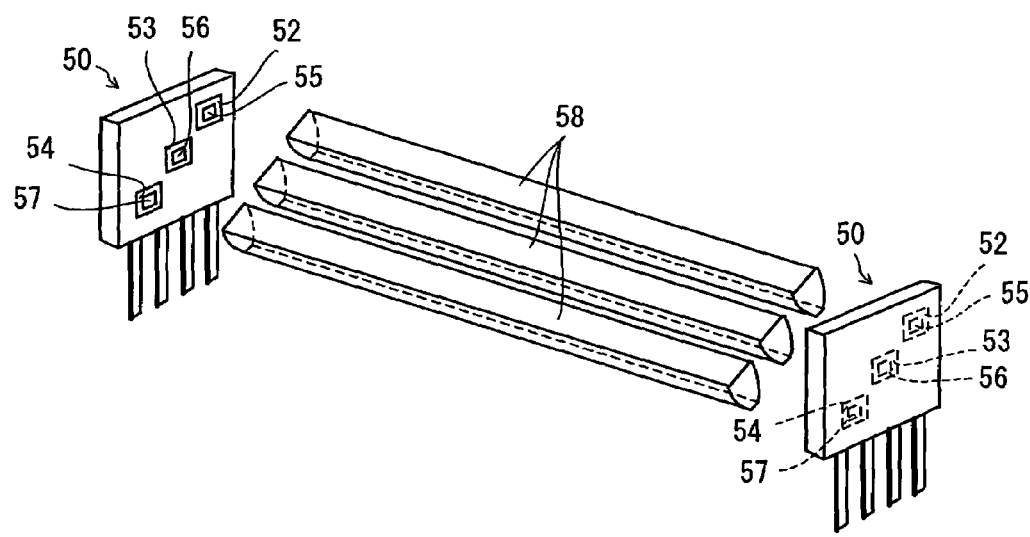
FIG. 6 is a perspective view showing another embodiment.
Figure 7:
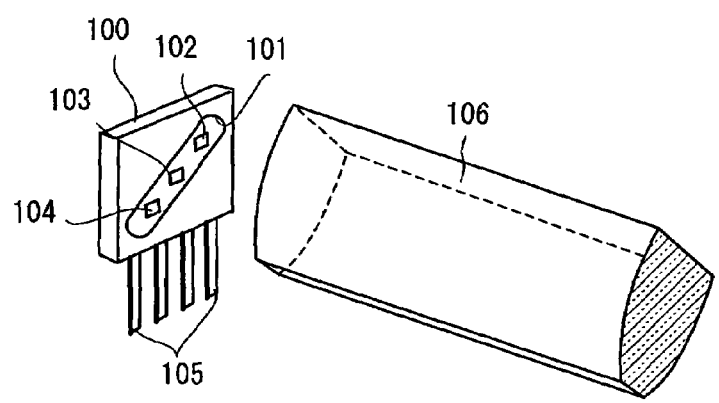
FIG. 7 is a view explaining a coupling section of the conventional line-illuminating device.

FIG. 6 is a perspective view showing another embodiment. In this embodiment, a substrate 51 of a light-emitting unit 50 is provided with three independent windows for coupling 52, 53 and 54, wherein a green-color light-emitting diode 55 is disposed in the window 52, a blue-color light-emitting diode 56 is disposed in the window 53, and a red-color light-emitting diode 57 is disposed in the window 54, respectively, and three bar-shaped light guides 58, 58 and 58 are coupled to correspond to the three windows 52, 53 and 54, respectively.

In this manner, if the window is individually provided for the light-emitting diode of each color and the slim bar-shaped light guide is respectively attached to each window, it is possible not only to increase the energy of propagating light, but also to increase the degree of freedom of the shape of the light guide and the scattering dot pattern and to control unevenness of the primary colors in the vicinity of a source of light.

Although there have been described what are the present embodiments of the invention, it will be understood that variations and modifications may be made thereto without departing from the spirit and essence of the invention. The scope of the invention is indicated by the appended claims.

What is claimed is:

1. A line-illuminating device comprising:
   an elongate bar-shaped light guide having opposite longitudinal ends; and
   light-emitting units, wherein
the light-emitting units are provided on each of said opposite longitudinal ends of the bar-shaped light guide, each of said light-emitting units having a substrate on which only one or two-color light-emitting elements of three primary colors is installed, and
the light-emitting elements of the light-emitting units on said opposite longitudinal ends collectively satisfy all of the three primary colors.

2. The line-illuminating device according to claim 1, wherein
the light-emitting unit on one of said ends is provided with a green-color light-emitting element and a blue-color light-emitting element,
while the light-emitting unit on the other of said ends is provided with a red-color light-emitting element.

3. An image-scanning device comprising
the line-illuminating device according to claim 2,
a line image sensor, and
a lens array for converging reflected light or transmitted light from a document on the line image sensor.

4. An image-scanning device according to claim 3, comprising a pair of said line-illuminating devices.

5. The line-illuminating device according to claim 1, wherein
the light-emitting unit on one of said ends is provided with a blue-color light-emitting element and a red-color light-emitting element,
while the light-emitting unit on the other of said ends is provided with a green-color light-emitting element and a red-color light-emitting element.

6. An image-scanning device comprising
the line-illuminating device according to claim 5,
a line image sensor, and
a lens array for converging reflected light or transmitted light from a document on the line image sensor.

7. An image-scanning device according to claim 6, comprising a pair of said line-illuminating devices.

8. An image-scanning device comprising
the line-illuminating device according to claim 1,
a line image sensor, and
a lens array for converging reflected light or transmitted light from a document on the line image sensor.

9. An image-scanning device according to claim 8, including a pair of said line-illuminating devices.

10. The line-illuminating device according to claim 1, wherein
the light-emitting unit on one of said ends of the bar-shaped light guide is provided with a green-color light-emitting element and a blue-color light-emitting element,
while the light-emitting unit on the other of said ends is provided with a pair of red-color light-emitting elements.

11. A line-illuminating device comprising:
bar-shaped light guides; and
light-emitting units,
wherein
each of said light-emitting units has a substrate which is provided with three windows and three light-emitting elements of three primary colors respectively disposed in the windows, and
three said bar-shaped light guides are provided between the light-emitting units to correspond to the three windows, respectively.

12. An image-scanning device comprising
the line-illuminating device according to claim 11,
a line image sensor, and
a lens array for converging reflected light or transmitted light from a document on the line image sensor.

13. A line-illuminating device comprising:
a pair of light-emitting units; and
at least one bar-shaped light guide disposed between the light-emitting units;
each said light-emitting unit including a substrate, a window disposed on said substrate in which one or two-color light-emitting elements of three primary colors are installed so as to emit light toward said at least one bar-shaped light guide; and
the light-emitting elements of the pair of light-emitting units collectively satisfy all of the three primary colors.

14. The line-illuminating device according to claim 13 including one said
bar-shaped light guide, wherein
the light-emitting unit on one end of the bar-shaped light guide is provided with a green-color light-emitting element and a blue-color light-emitting element,
while the light-emitting unit on the other end is provided with a red-color light-emitting element.

15. The line-illuminating device according to claim 13 including one said bar-shaped light guide, wherein
the light-emitting unit on one end of the bar-shaped light guide is provided with a blue-color light-emitting element and a red-color light-emitting element,
while the light-emitting unit on the other end is provided with a green-color light-emitting element and a red-color light-emitting element.

16. The line-illuminating device according to claim 13 including three said bar-shaped light guides, wherein
each light-emitting unit has a substrate which is provided with three of said windows and three light-emitting elements of three primary colors respectively disposed in the windows, and
said three said bar-shaped light guides are provided between the light-emitting units to correspond to the three windows, respectively.

* * * * *

UNITED STATES PATENT AND TRADEMARK OFFICE
CERTIFICATE OF CORRECTION

PATENT NO. : 7,316,353 B2
APPLICATION NO. : 11/025431
DATED : January 8, 2008
INVENTOR(S) : Ikeda et al.

It is certified that error appears in the above-identified patent and that said Letters Patent is hereby corrected as shown below:

Title Page:
After "(73)   Assignee:", change "Glass, Co.," to -- Glass Co., --.

Column 1:
Line 54, insert proper spacing: change "about 1.1 mmx2.8 mm." to -- about 1.1 mm x 2.8 mm. --.

Column 2:
Line 3, change "It is therefore an object" to -- It is, therefore, an object --.
Line 5, change "light traveling the inside" to -- light traveling inside --.
Line 11, change "a bar-shaped light guide, each light-emitting" to -- an elongate bar-shaped light guide, having two opposite longitudinal ends, each light-emitting --.
Line 12, change "on which one or two-color" to -- on which only one- or two-color --.
Line 14, change "on opposite ends col-" to -- on opposite longitudinal ends of the bar-shaped light guide col- --.
Line 48, change "a cross sectional area" to -- a cross-sectional area --.
Line 50, change "cross sectional area of" to -- cross-sectional area of --.
Line 51, change "traveling the inside the" to -- traveling inside the --.

Column 3:
Line 46, change "the line illuminating device" to -- the line-illuminating device --.
Line 53, change "are formed one quarter" to -- are formed one-quarter --.

Column 4:
Line 18, change "light of green and blue-color" to -- light of green- and blue-color --.
Line 22, change "the green and blue-color LED" to -- the green- and blue-color LED --.
Line 34, change "green and blue-color LED" to -- green- and blue-color LED --.

UNITED STATES PATENT AND TRADEMARK OFFICE
CERTIFICATE OF CORRECTION

PATENT NO. : 7,316,353 B2
APPLICATION NO. : 11/025431
DATED : January 8, 2008
INVENTOR(S) : Ikeda et al.

It is certified that error appears in the above-identified patent and that said Letters Patent is hereby corrected as shown below:

Column 5:
    Line 5, change "only one or two-color" to -- only one- or two-color --.

Column 6:
    Line 22, change "in which one or" to -- in which one- or --.
    Lines 29-30 should be one continuous line:
-- including one said bar-shaped light guide, wherein --.

Signed and Sealed this

Eighth Day of July, 2008

JON W. DUDAS
*Director of the United States Patent and Trademark Office*